UNITED STATES PATENT OFFICE.

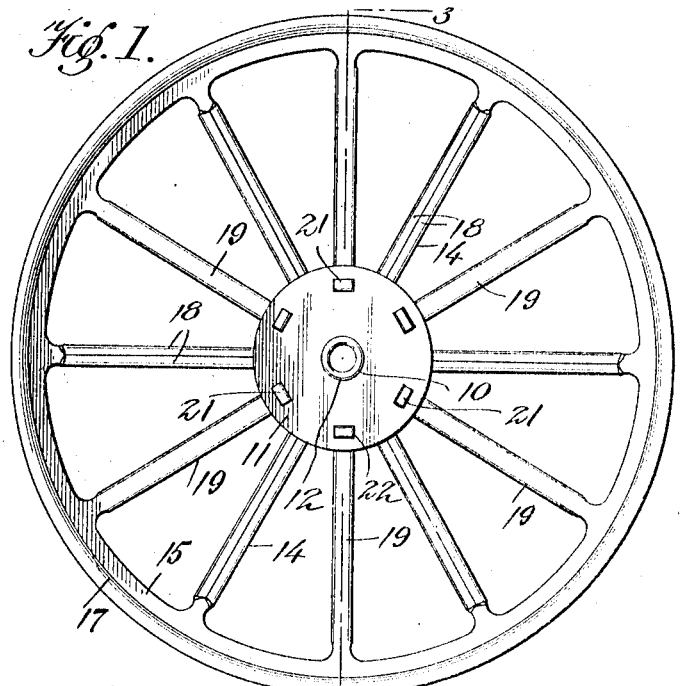
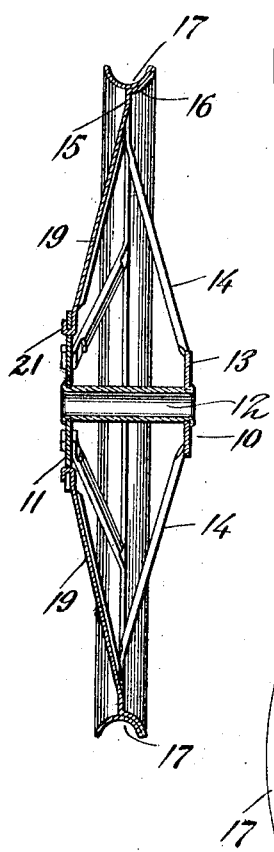
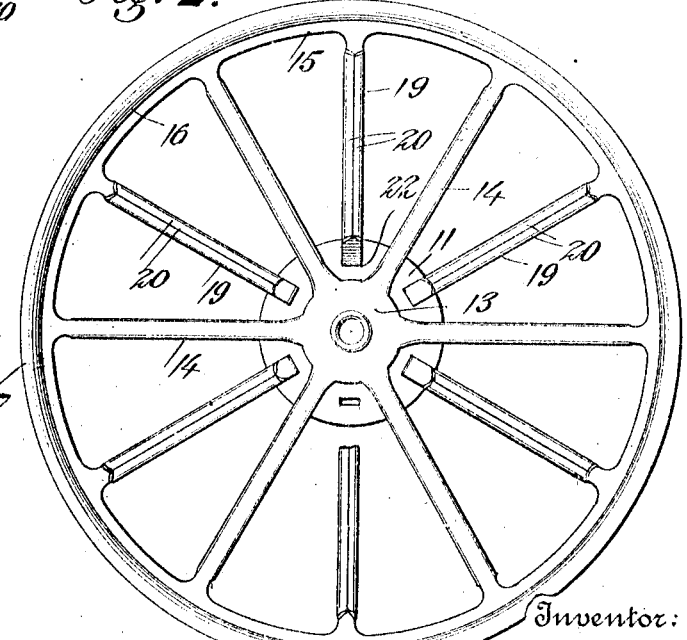

PER G. ANDERSON, OF ELKHART, INDIANA, ASSIGNOR OF ONE-HALF TO FRANK M. BATHRICK AND FRED J. PALMER, BOTH OF ELKHART, INDIANA.

WHEEL.

1,084,875.   Specification of Letters Patent.   Patented Jan. 20, 1914.

Application filed September 30, 1912. Serial No. 723,213.

*To all whom it may concern:*

Be it known that I, PER G. ANDERSON, a citizen of the United States, residing at Elkhart, in the county of Elkhart and State of Indiana, have invented certain new and useful Improvements in Wheels, of which the following is a specification.

The invention relates to carriages and wagons and has for an object to provide wheels therefor.

The invention embodies among other features a wheel of durable construction and which is composed of few parts, the various parts of the wheel being preferably stamped from metal or cast.

In the further disclosure of the invention reference is to be had to the accompanying drawings, constituting a part of the specification, in which similar characters of reference denote corresponding parts in all the views, and in which—

Figure 1 is a side elevation of the wheel looking at one side thereof. Fig. 2 is a side elevation of the wheel looking at the other side thereof. Fig. 3 is a vertical sectional view, taken on the line 3—3 in Fig. 1.

Referring more particularly to the drawings use is made of a hub 10 consisting of a hub plate 11 provided with a tubular shank 12, a hub plate 13 being swaged or otherwise mounted on the free end of the shank 12 and having spokes 14 formed therewith and radiating therefrom, the said spokes 14 terminating in a rim 15, formed integrally with the spokes and preferably consisting of a flange portion 16 bent to one side of the spokes 14 and then bent upon itself to form a rim portion proper 17, the said portion being grooved, as shown. The hub plate 13, together with the spokes 14 and rim 15, is preferably stamped from a single piece of sheet metal and the spokes when stamped are provided with side pieces 18, which are bent inwardly and flattened against the body of each spoke to form reinforcing members for the spokes. Formed with the flange portion 16 of the rim 15 and extending therefrom in a diametrical direction are spokes 19, similar to the spokes 14 and having reinforcing members 20, similar to the reinforcing members formed by the side pieces of the spokes 14, the spokes 19, however, having the free ends thereof terminating in ears 21 which pass through openings 22 formed in the hub plate 11, thus securing the free ends of the spokes 19 rigidly to the hub plate 11 to form the completed wheel, it being readily understood that the spokes 14 and spokes 19 are bowed outwardly between the hub plates and the rim 15 to properly space said hub plates for the intervention of the shank 12.

It should be noted that the wheel described consists substantially of three distinct parts and if desirable can be formed of two distinct parts, the hub plate 11 and shank 12 in the first instance being separate pieces connected in any suitable manner with the remainder of the wheel attached to the hub plate 11, the hub plate 13, spokes 14 and 19 and rim 15 being stamped from a single piece of sheet metal, as mentioned heretofore, whereas in the latter instance the hub plate 11 and shank 12 can be stamped from a single piece of material and the integral hub plate 13, spokes 14 and 19 and rim 15 are then supported on the hub plate 11 by securing the free ends of the spokes 19 thereto.

Wheels of the character described and formed in the manner mentioned, on account of the fact that the majority of the parts of the wheels are integral, will have great strength and will efficiently resist the wear and jar to which wheels for carriages and wagons are subjected. The wheels described herein on account of being stamped from sheet metal or the like can be cheaply manufactured and will also present a neat and effective appearance.

Having thus described the invention what is claimed as new, is:—

A vehicle wheel comprising a rim, a hub disk, and companion groups of spokes, all stamped from a single piece of metal, the spokes of one of said groups having their inner ends extended directly into the disk and disposed at an angle with the spokes of the other group, the spokes of the other group having bendable inner ends terminating at points beyond the juncture of the first spokes with said disk, a second disk having a greater diameter than the first disk and lying in spaced relation thereto and having a circular series of passages respectively receiving the bendable ends of the second spokes, and a hub tube connecting the disks with each other.

In testimony whereof I affix my signature in presence of two witnesses.

PER G. ANDERSON.

Witnesses:
 GLEN R. SAWYER,
 CLAUDE A. LEE.